US012433805B2

(12) United States Patent
Choi et al.

(10) Patent No.: US 12,433,805 B2
(45) Date of Patent: Oct. 7, 2025

(54) MANUAL WHEELCHAIR PROPULSION AID DEVICE USING MECHANICAL SELF-ENERGIZING ACTION

(71) Applicant: KAIST (Korea Advanced Institute of Science and Technology), Daejeon (KR)

(72) Inventors: Sei-Bum Choi, Daejeon (KR); Min-Hyun Kim, Daejeon (KR)

(73) Assignee: KAIST (KOREA ADVANCED INSTITUTE OF SCIENCE AND TECHNOLOGY), Daejeon (KR)

( * ) Notice: Subject to any disclaimer, the term of this patent is extended or adjusted under 35 U.S.C. 154(b) by 957 days.

(21) Appl. No.: 17/561,771

(22) Filed: Dec. 24, 2021

(65) Prior Publication Data

US 2022/0117807 A1    Apr. 21, 2022

Related U.S. Application Data

(63) Continuation of application No. PCT/KR2020/008310, filed on Jun. 26, 2020.

(30) Foreign Application Priority Data

Jun. 26, 2019    (KR) ........................ 10-2019-0076242

(51) Int. Cl.
*A61G 5/04*    (2013.01)
*A61G 5/10*    (2006.01)
*B60L 50/60*    (2019.01)

(52) U.S. Cl.
CPC ........... *A61G 5/047* (2013.01); *A61G 5/1078* (2016.11); *B60L 50/60* (2019.02); *B60L 2200/34* (2013.01)

(58) Field of Classification Search
CPC ...... A61G 5/047; A61G 5/1078; A61G 5/024; A61G 5/1005; A61G 2203/70; B60L 50/60; B60L 2200/34; B60L 2220/44; Y02T 10/70; Y02T 10/7072; Y02T 90/14; B60K 1/00; B60K 2001/0411; B60S 5/06
See application file for complete search history.

(56) References Cited

U.S. PATENT DOCUMENTS

| | | | | |
|---|---|---|---|---|
| 4,386,672 A * | 6/1983 | Coker | ..................... | A61G 5/047 180/907 |
| 5,222,567 A * | 6/1993 | Broadhead | ............... | B60K 1/00 180/907 |
| 5,651,422 A * | 7/1997 | Casali | ................... | B62B 5/0026 180/907 |
| 8,684,113 B1 * | 4/2014 | Laconis | ................. | A61G 5/047 180/11 |

(Continued)

*Primary Examiner* — Minnah L Seoh
*Assistant Examiner* — Abigail R Hymel
(74) *Attorney, Agent, or Firm* — LEX IP MEISTER, PLLC

(57) ABSTRACT

A propulsion assist device connected to a manual wheelchair to provide driving force is disclosed. The propulsion assist device provides sufficient driving force and braking force while using the motor by the self-energizing effect. The propulsion assist device can be easily connected to manual wheelchairs without the need for bending over. The self-energizing effect is provided in a mechanical way, and the risk of failure is low due to the simple structure of the device.

The propulsion assist device is economically priced, enabling the elderly and disabled to improve their self-esteem as members of society and engage in safer and more active social activities.

18 Claims, 14 Drawing Sheets

(56) References Cited

U.S. PATENT DOCUMENTS

| 11,524,742 | B2* | 12/2022 | Heredia Martinez | B62J 25/08 |
| 2004/0007400 | A1* | 1/2004 | Chu | A61G 5/047 |
| | | | | 180/13 |
| 2011/0095508 | A1* | 4/2011 | Chiu | A61G 5/047 |
| | | | | 280/304.1 |

* cited by examiner $$\sum F_x = f - R\sin\theta = 0$$
$$\sum F_y = N - mg - R\cos\theta = 0$$
$$f \leq \mu_s N$$
$$\mu_s \geq \frac{f}{N} = \frac{R\sin\theta}{R\cos\theta + mg}$$
$$\mu_s > \tan\theta$$

MANUAL WHEELCHAIR PROPULSION AID DEVICE USING MECHANICAL SELF-ENERGIZING ACTION

TECHNICAL FIELD

The present invention relates to a propulsion assist device for a manual wheelchair, and more particularly, to a propulsion assist device detachably connected to a manual wheelchair so that the manual wheelchair can be electrically moved, occupying a small volume but providing sufficient driving force using self-energizing effect, easily detachable from manual wheelchairs without the need for wheelchair users to bend over.

BACKGROUND ART

Manual wheelchairs used by the elderly and the disabled for mobility are relatively inexpensive and portable, but their mobility is poor. Electric wheelchairs have better mobility and are convenient to operate, but they are expensive and difficult to carry. Although wheelchair users prefer electric wheelchairs, it is difficult to spread them widely due to the high cost and difficulty of moving using a car (portability).

Recently, propulsion aids that can be attached to and detached from a manual wheelchair are attracting attention. Examples of propulsion aids that can be attached to and detached from manual wheelchairs include RioMobility's Firefly and MaxMobility's SmartDrive, etc. The Firefly is attached to the front of the manual wheelchair like a scooter, and the SmartDrive is attached to the back of the manual wheelchair and controlled using a wristband-type Bluetooth device. However, in the case of Firefly, the volume of the entire device increases significantly after attachment, and the center of gravity moves forward. In the case of Smart-Drive, there is a possibility of malfunction since it is controlled using Bluetooth. In addition, both products have a problem in that they have to tilt or rotate the upper body greatly while holding the device during the detachment process, which puts strain on the arms and shoulders and may cause falls.

The inventors of the present invention have proposed a motorized assistive device for a manual wheelchair using a mechanical self-energizing effect in order to solve the problems of the aforementioned conventional propulsion aids. This electric assist device uses a link member to mechanically provide a self-energizing effect when moving forward and backward, so that it can produce sufficient output while using a hub motor having a small output. Accordingly, the size of the device can be made small, and the device can be controlled by mechanical connection. However, the number of link members for providing a self-energizing effect was rather large.

DISCLOSURE

Technical Problem

The present invention is intended to solve the above-mentioned problems, an object of the present invention is to provide a manual wheelchair which occupies a small volume, but provides sufficient driving force using self-energizing effect, and which can respond when a malfunction of the electronic control occurs and which can be easily detached from the manual wheelchair without the wheelchair user having to bend over.

Another object of the present invention is to reduce the number of members of the mechanism providing the self-energizing effect to further reduce the weight and size of the device and to make it more robust to failure.

Technical Solution

In order to achieve the above-mentioned object, there is provided a propulsion assist device detachable to a manual wheelchair, comprising: a main body; a handle provided on one end of the main body; a wheel operatively connected to other end of the main body and driven by a motor; a coupling unit for detachably connecting the main body to the manual wheelchair; and a wheel connection unit assisting the operation of the wheel in a self-energizing manner, one end of the wheel connection unit being connected to the other end of the main body, and, to other end of the wheel connection unit, the wheel being rotatably connected, wherein the wheel connection unit including: a base member extending in a direction perpendicular to the axis of rotation of the wheel and fixed to the main body; a first link having one end connected to one end of the base member for rotational movement, and the rotational movement being limited by interference with the base member in a partial range; and, a second link rotating in a direction opposite to the direction of rotation of the wheel when accelerating the manual wheelchair, rotational motion of the second link being limited to a partial range by interference with the base member or the first link, whereby provides a self-energizing effect to the wheel.

Advantageous Effects

According to the present invention, there is provided a propulsion assist device having a compact shape that does not occupy a large volume and providing sufficient driving force to move a manual wheelchair by mechanical self-energizing effect.

In addition, the propulsion assist device in accordance with the present invention solves the absence of a mechanical backup element and the detachment process in which there is a risk of a fall accident found in existing products.

Furthermore, the propulsion assist device in accordance with the present invention can reduce the volume and weight of the device by simplifying the structure of the mechanism providing the self-energizing effect.

MODE FOR INVENTION

Figure 1:
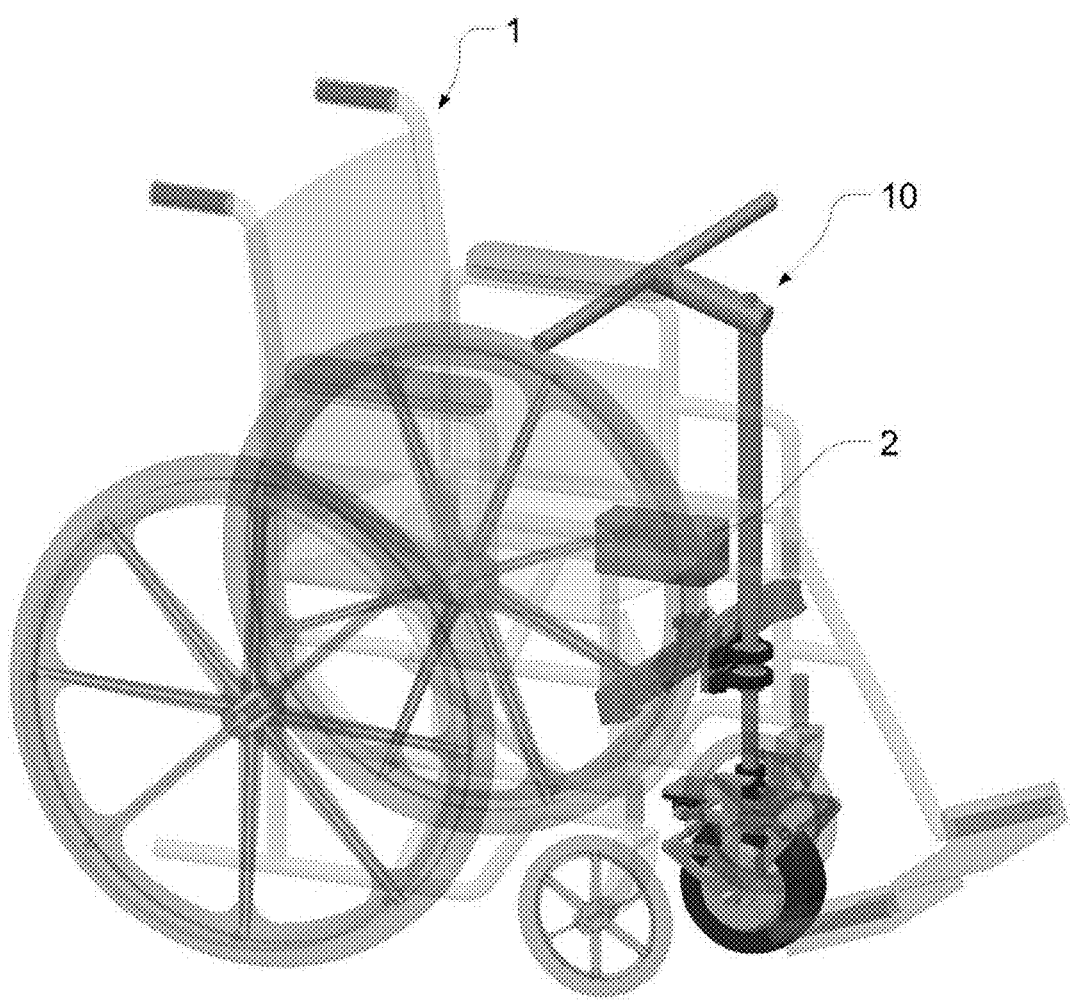
FIG. 1 is a perspective view schematically illustrating a state in which a propulsion assist device in accordance with an embodiment of the present invention is mounted on a manual wheelchair.

Hereinafter, exemplary embodiments of the present Embodiments of the present invention will be described in detail with reference to the accompanying drawings hereinafter. The same or similar reference numerals are assigned to the same or similar components, and redundant descriptions thereof will be omitted. In describing the embodiments disclosed in the present specification, when it is determined that a detailed description of related known technologies may obscure the subject matter of the embodiments disclosed in the present specification, the detailed description thereof will be omitted. The accompanying drawings are only for making it easier to understand the embodiments disclosed in the present specification, and the technical concepts disclosed in the present specification are not limited by the accompanying drawings.

Terms including ordinal numbers such as "first" and "second" can be used to describe various components, but these terms are only used to distinguish one component from another, and the technical meanings of corresponding components are not limited by these terms. Singular expressions such as "a" or "an" include plural expressions also unless the context clearly indicates otherwise.

As used herein, terms such as "comprises", "includes" or "have" should be understood as limiting the existence of features, steps, components, or combinations thereof described in the specification, and one or more other features. It is not intended to exclude the possibility of the presence or addition of features, steps, components, or combinations thereof.

Figure 2:
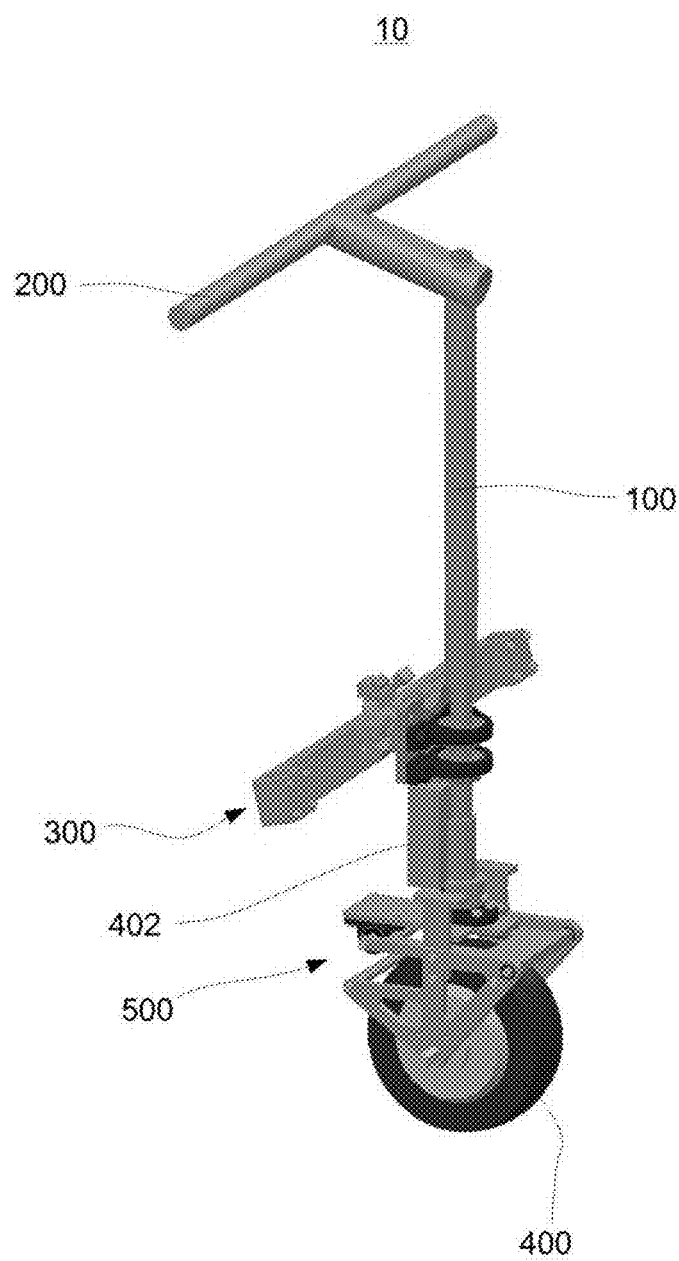
FIG. 2 is a perspective view showing only the propulsion assist device in the embodiment shown in FIG. 1.

FIG. 1 and FIG. 2 show a schematic configuration of a propulsion assist device that is detachably attached to a manual wheelchair in accordance with an embodiment of the present invention. FIG. 1 is a diagram illustrating a state in which a propulsion assist device in accordance with an embodiment of the present invention is attached to a manual wheelchair, and FIG. 2 is a diagram schematically illustrating only the configuration of the propulsion assist device shown in FIG. 1.

As shown in FIG. 1, the propulsion assist device 10 in accordance with an embodiment of the present invention is configured to be selectively detachable from a manual wheelchair 1 to assist in driving according to the user's convenience. The propulsion assist device 10 is mounted on the manual wheelchair to be located behind the footrest of the manual wheelchair 1 and between the user's thighs. Since the volume of the propulsion assist device 10 of the present invention is small, it can be mounted between the user's thighs and behind the footrest of the manual wheelchair 1. In addition, it is mounted below the center of gravity of the manual wheelchair 1 to help the efficient traction of the manual wheelchair 1.

As shown, the propulsion assistive device 10 in accordance with the present invention has a main body 100, a handle 200 provided at one end of the main body 100, a coupling unit 300 for detachably connecting the main body 100 to the manual wheelchair 1, a wheel 400 operably connected to the other end of the main body 100 and driven by a motor, and a wheel connection unit 500 whose one end is connected to the other end of the main body 100, and whose the other end is configured to assist the operation of the wheel 400 in a self-energizing manner.

The main body 100 is generally formed to be elongated in the shape of a rod, and parts having different diameters may be connected as necessary to form stage(s). In the illustrated embodiment, the main body 100 has a cylindrical shape. The battery may be installed in the main body 100 or may be separated and disposed in the wheelchair. In the illustrated embodiment, it is separated from the body and installed in the wheelchair (reference numeral 2).

A handle 200 is provided at one end of the main body 100, and the handle 200 may be formed in a shape similar to that of a bicycle. A brake (not shown) capable of manual control of driving and braking of the wheel 400 by a user's operation may be provided. It is possible to steer the propulsion assist device 10 by using the handle 200, and relative motion in the lateral direction does not act on the wheel 400 and the wheel connection unit 500.

Figure 8:
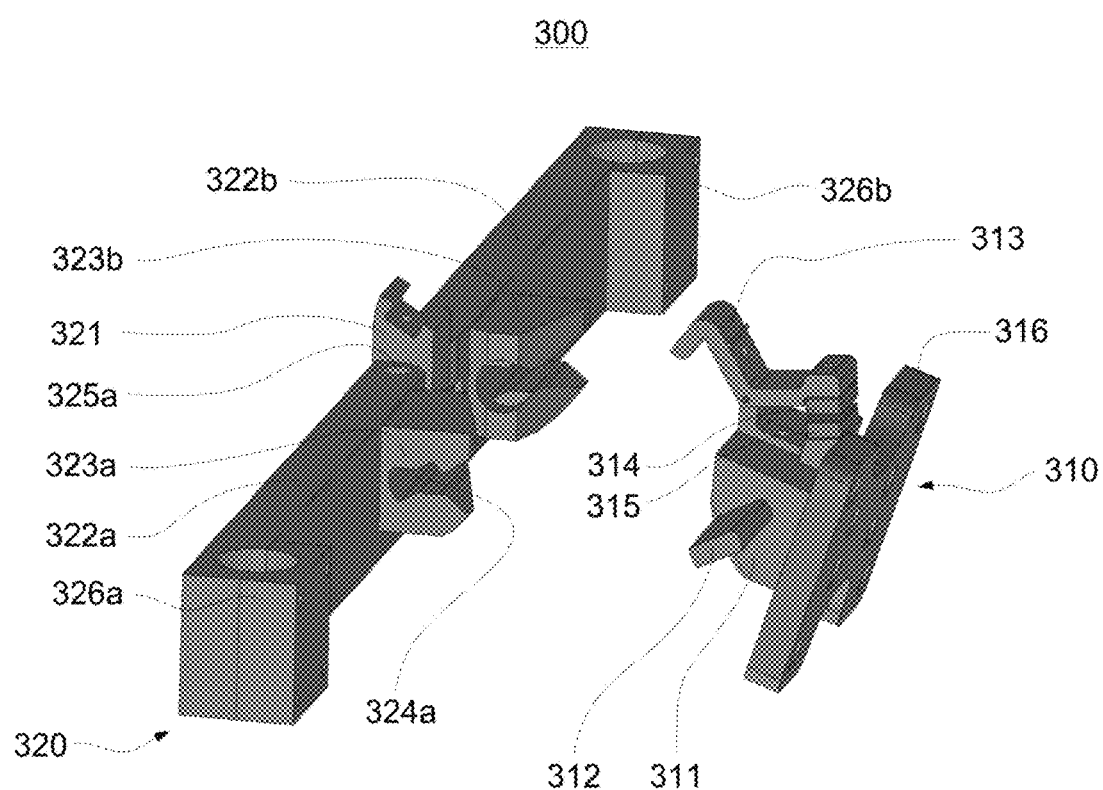
FIG. 8 shows the coupling unit of the propulsion assist device shown in FIG. 1, being in a state in which the propulsion-assist-device-side coupling member and the wheelchair-side coupling member are separated.
Figure 9:
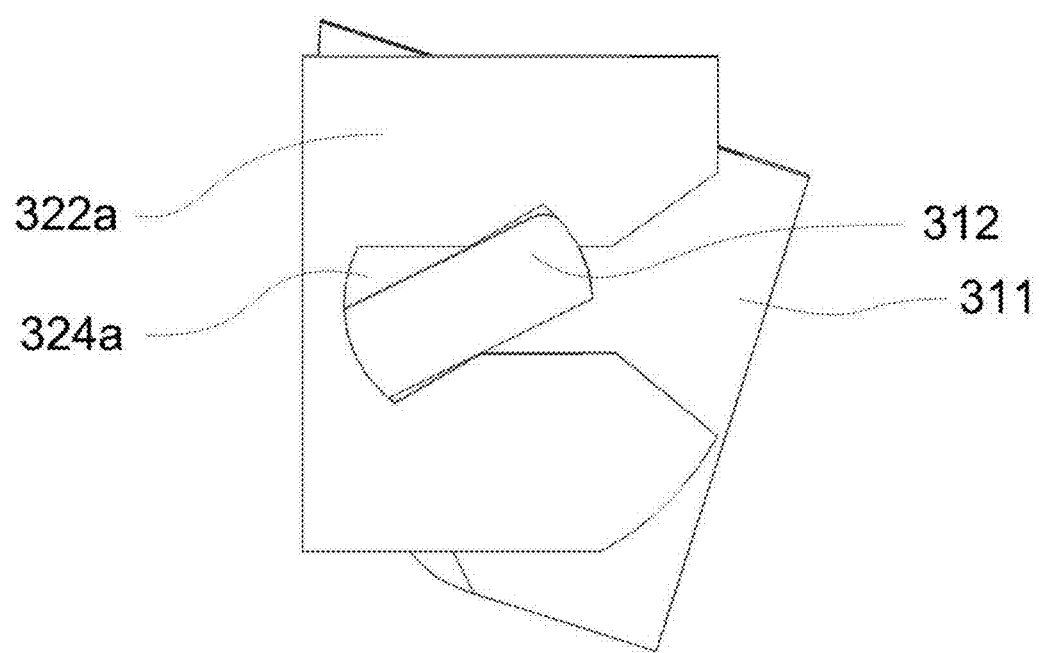
FIG. 9 is a view for explaining a state in which the coupling unit shown in FIG. 8 is coupled.

The main body 100 is rotatably connected to a coupling unit 300 for detachably connecting the propulsion assist device 10 to the manual wheelchair 1. The coupling unit 300 includes a propulsion-assist-device-side coupling member 310 connected to the main body 100 and a wheelchair-side coupling member 320 connected to the wheelchair 1. The coupling unit 300 will be described in detail later with reference to FIGS. 8 and 9.

The wheel 400 is operatively connected to the other end of the main body 100, which is the opposite end of the one end to which the handle 200 of the body 100 is connected, and is driven by a motor. In the illustrated embodiment, the motor driving unit 402 is installed in a region adjacent to the other end of the main body 100. The motor driving unit 402 is provided with means for electrically connecting to the battery 2 installed in the wheelchair 1. The wheel 400 may be provided in a form in which, for example, a small in-wheel motor having a size of 5 inches is integrally provided or combined with a general motor. In general, the driving force of the wheel is proportional to the vertical drag, but the motor has a relatively small driving force. The maximum traction force of the wheel is limited by the wheel normal load, but the static normal load is relatively small. The normal load is mechanically amplified through a wheel connection unit providing a self-energizing effect. In the present invention, while a motor is used to reduce the volume of the device, a relatively small driving force is mechanically supplemented through a wheel connection unit providing a self-energizing effect. The wheel connection unit 500 will be described in detail later with reference to FIGS. 6 and 7.

Figure 3:
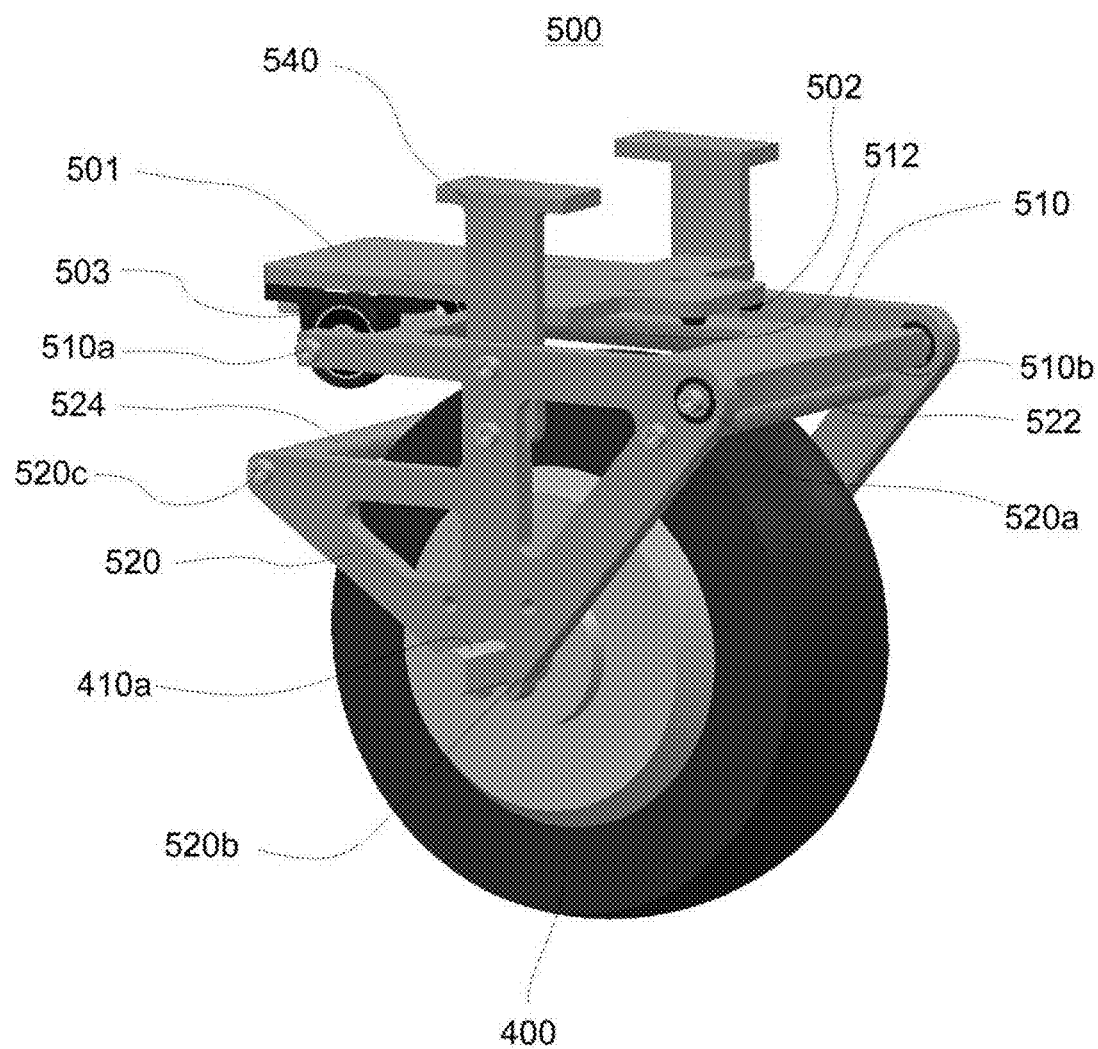
FIG. 3 is a perspective view showing only the wheel connection unit that provides a mechanical self-energizing effect in the propulsion assist device of the embodiment shown in FIG. 1.

The self-energizing effect in accordance with the present invention is mechanically provided by the wheel connection unit 500. FIG. 3 is a perspective view of the wheel connection unit 500 in accordance with the embodiment shown in FIGS. 1 and 2.

One end of the wheel connection unit 500 is connected to the other end of the main body 100, and the other end of the wheel connection unit 500 assists the operation of the wheel 400 in a self-energizing manner. The wheel connection unit 500 extends in a direction perpendicular to the rotation axis of the wheel 400 and includes, a base member 501 extending in a direction orthogonal to the axis of rotation of the wheel 400 and fixed to the main body 100; a first link 510 operatively connected to one end of the base member 501; and, a second link 520 having at least three ends, a first end 520a being operatively connected with a first link 510 and a second end 520b being operatively connected with the rotational axis of the wheel 400 and a third end 520c being a free end.

In the illustrated embodiment, the first link 510 is connected to the base member 501 via the bearing 503 at the wheelchair-side end 510a, so that it can rotate with respect to the wheelchair-side end 510a. The rotational movement of the first link 510 is limited by interference with the base member 501. A buffer member 502 formed of an elastic material is provided at a point where the first link 510 comes into contact with the base member 501 in order to alleviate the impact upon contact. Since the first link 510 may interfere with the wheel 400 depending on the operating conditions of the wheel connection unit 500, an interference avoidance hole 512 is provided in the first link 510 to prevent this. When the first link 510 is a condition in which interference occurs with the outer circumferential surface of the wheel 400 depending on the operating state, the outer circumferential surface of the wheel 400 passes through the interference avoidance hole 512 to avoid interference. The other end 510b of the first link 510 is rotatably connected to the second link 520.

The second link 520 has at least three ends. In the illustrated embodiment, the second link 520 has a shape that connects two right-angled triangles, and is formed in such a way that members of the same shape are disposed on both sides of the wheel to be connected to each other. The first end 520a of the second link 520 is rotatably connected to the other end of the first link 510; the second end 520b is non-rotatably connected to the wheel at the point 410a at which the axis of rotation of the wheel 400 extends; and the third end 520c is a free end.

In the illustrated embodiment, the second link 520 is formed by connecting members of the same shape to the left and right side surfaces of the wheel. A front connecting member 522 is provided at a point adjacent to the first end 510a to connect the left and right side members, and a rear connecting member 524 is provided at a point adjacent to the third end 510c.

The wheel connection unit 500 further includes a stopper 540 for limiting the rotation shaft of the wheel 400 to be positioned within a predetermined range from the base member 501. The stopper 540 is formed to extend in a direction from the second link 520 toward the base member 501, and such that an end of the base member side interferes with the base member 501.

Figure 4:
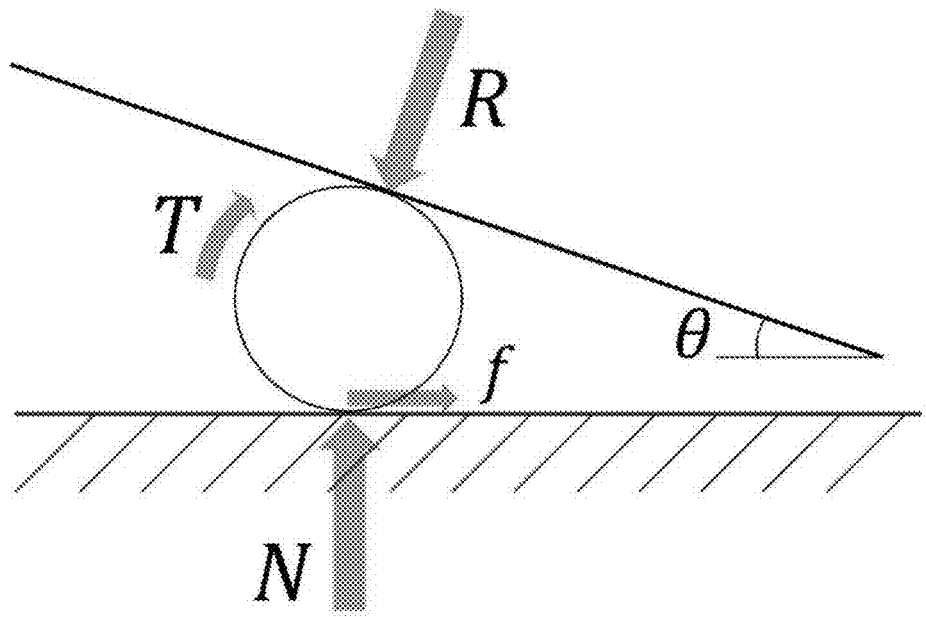
FIG. 4 is a free-body diagram for explaining the self-energizing effect provided by the propulsion assist device in accordance with the present invention.

FIG. 4 is a free-body diagram for explaining the self-energizing effect of the propulsion assist device 10 detachable to the manual wheelchair 1 in accordance with the present invention. When traction is applied to the wheel 400, the propulsion assist device 10 applies a force R in an inclined direction to the wheel, thereby increasing the normal force N. As the normal force N increases, the traction also increases. If the force R in the inclined direction can be provided in both directions, the self-energizing effect appears both in the forward and backward directions. The formula shown in FIG. 4 represents the conditions under which the self-energizing effect occurs. If the tang of the inclined surface providing the force R in the inclined direction is less than the maximum coefficient of static friction ($\mu s$) of the floor, the wheel does not lose traction due to the self-energizing effect.

Figure 5:
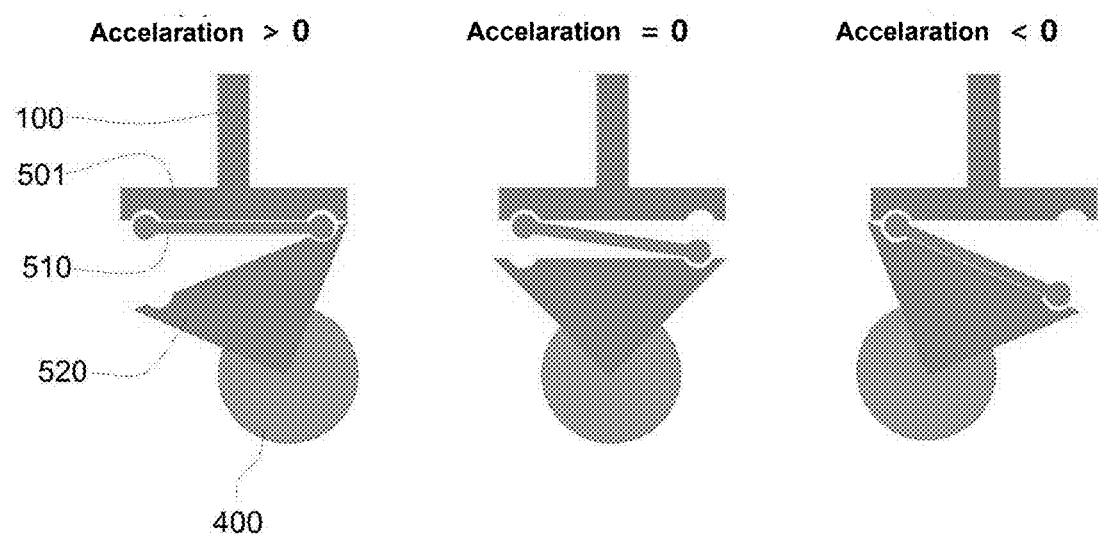
FIG. 5 is a conceptual diagram for explaining the self-energizing effect in accordance with the present invention.

FIG. 5 is a conceptual diagram for explaining the self-energizing effect in accordance with the present invention. When the acceleration is 0, that is, when the device is in a stationary state or moving at a constant speed, the first link 510 and the second link 520 can freely rotate within a predetermined range. When the acceleration is greater than zero, that is, when the device accelerates forward, the wheel 400 moves forward with respect to the main body 100. Accordingly, the first link 510 rotates counterclockwise to contact the base member 501, and interfere with each other to limit rotation of the first link 510. The second link 520 rotates counterclockwise with respect to the first link 510 while moving forward along the wheel 400 at the same time, but as the rotation of the first link 510 is limited, the second link 520 rotation is also limited. In a state in which rotation of the first link 510 and the second link 520 is limited, a self-energizing effect is provided to the wheel 400 by the second link 520. Conversely, when the acceleration is less than 0, that is, when the device accelerates toward the rear (including a case where the speed is reduced to stop), the wheel 400 moves rearward with respect to the main body 100. Accordingly, the first link 510 and the second link 520 rotate in a clockwise direction. At a predetermined rotation angle, the second link 520 interferes with the first link 510 to limit rotation. When the rotation of the second link 520 is limited, thereby providing a self-energizing effect to the wheel 400.

Figure 6:
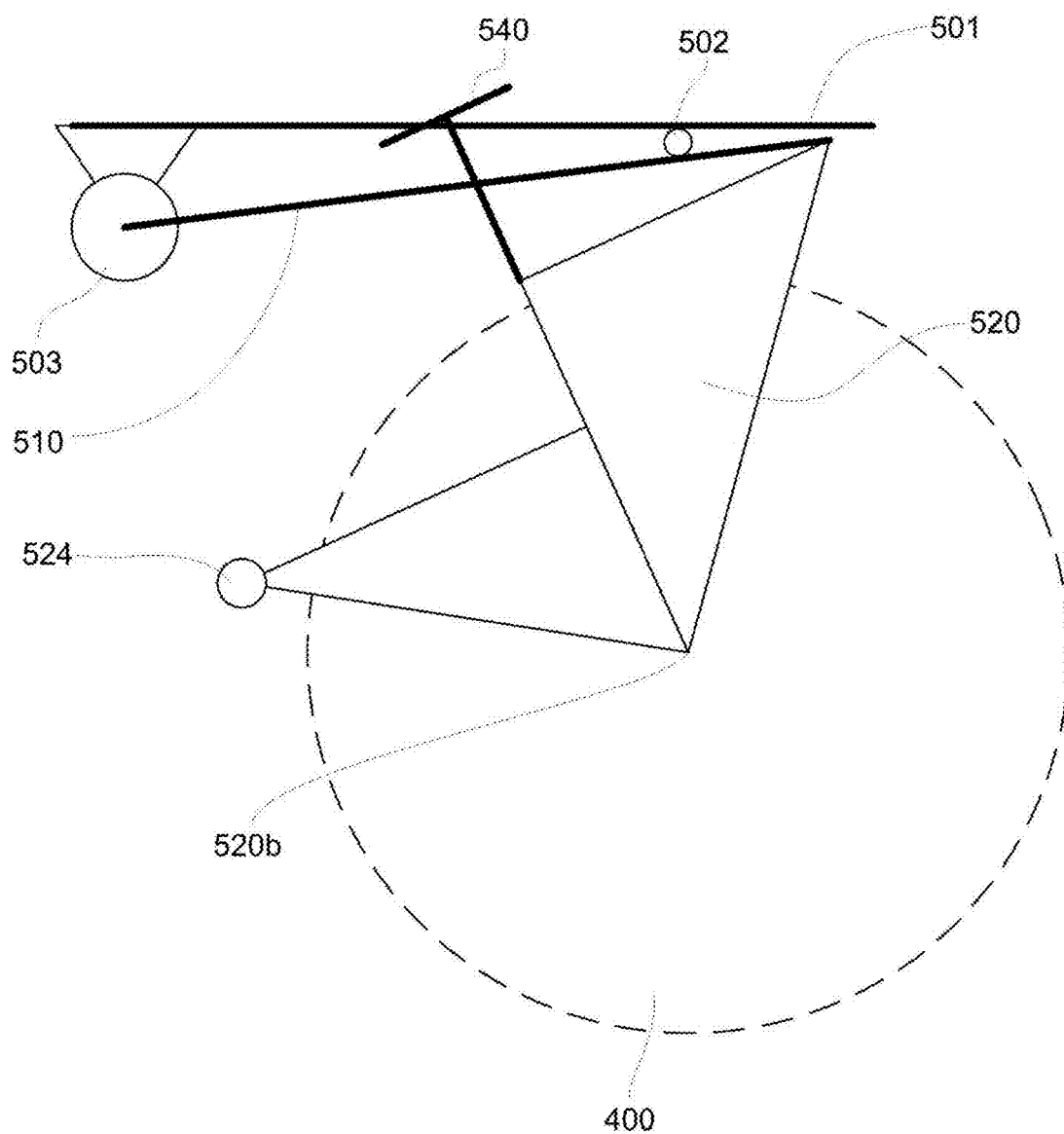
FIG. 6 is a view schematically illustrating a case in which a wheel connection portion of the propulsion assist device shown in FIG. 3 is in a forward driving state.
Figure 7:
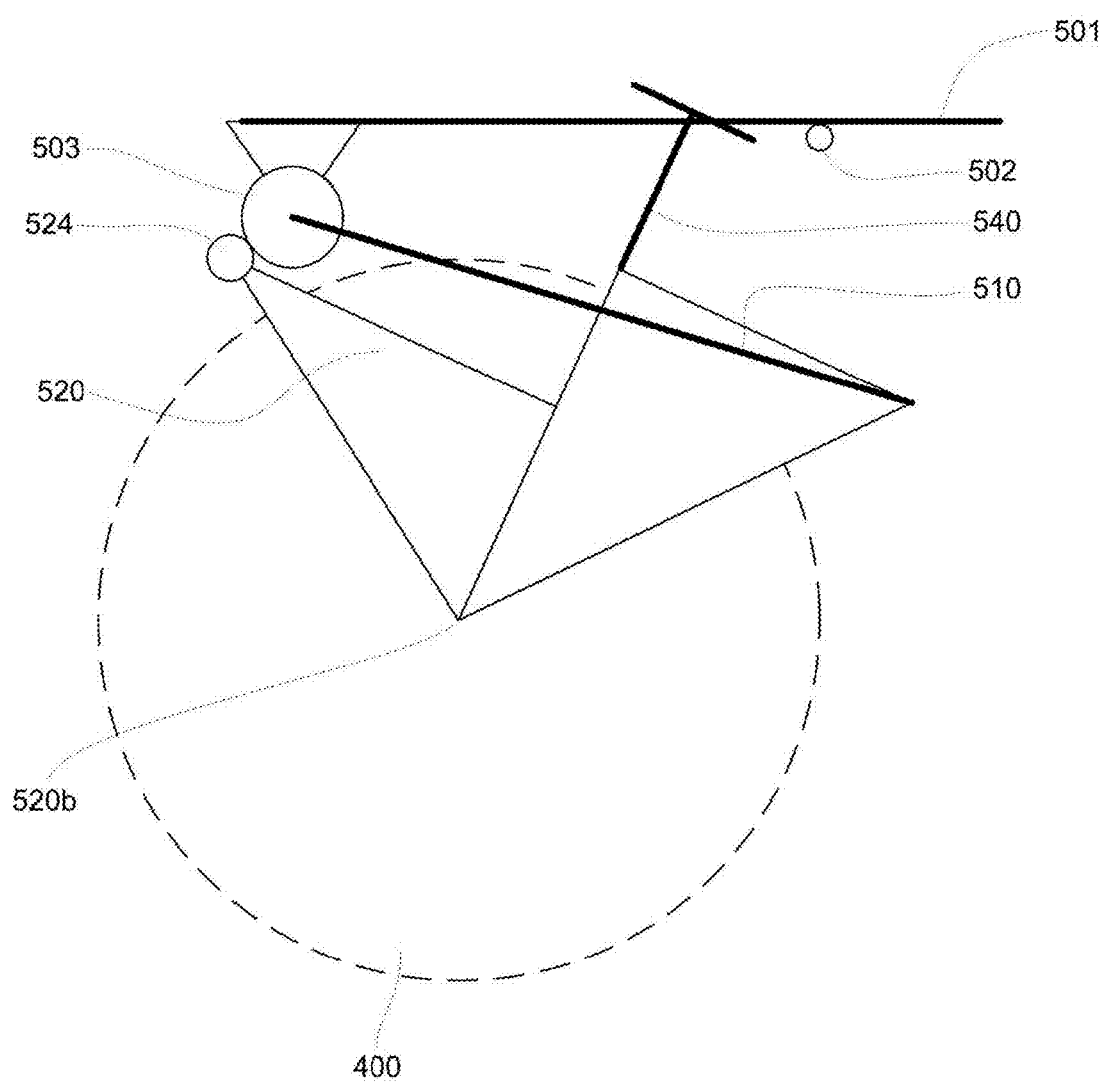
FIG. 7 is a view schematically illustrating a case in which a wheel connection portion of the propulsion assist device shown in FIG. 3 is in a reverse driving state.

FIGS. 6 and 7 are views for explaining the operation of the wheel connection unit 500 according to the illustrated embodiment. FIG. 6 schematically shows the wheel connection unit 500 when the wheel 400 accelerates in the forward direction in a state in which the propulsion assist device 10 is coupled to the manual wheelchair 1, and FIG. 7 schematically shows the wheel connection unit 500 when the wheel 400 accelerates in the rearward direction.

When the wheel 400 accelerates in the forward direction, the first link 510 rotates counterclockwise in the drawing by the torque of the in-wheel motor, and then touches the buffer member 502 of the base member 501 to limit the rotational movement. Then, the stopper 540 interferes with the base member 501 to limit the rotation shaft of the wheel 400 from further moving forward. Accordingly, the rotational movement of the second link 520 is limited. In a state in which both the rotation of the first link 510 and the second link 520 are limited, a force in an inclined direction is applied to the wheel 400 by the second link 520 to provide a self-energizing effect. At this time, the reaction force to the torque of the in-wheel motor acts on the second link 520 to press the wheel 400 in the direction of gravity, and the vertical force increases, resulting in the self-energizing effect to increase the driving force.

Meanwhile, as shown in FIG. 7, when braking is performed by accelerating in the rearward direction or by holding the brake, the rear connection member 524 provided at the third end of the second link 520 comes into contact with the bearing 503 to limit the rotational movement, and the stopper 540 interferes with the base member 501 to limit the wheel 400 from further advancing backward. This establishes the conditions for the self-energizing effect to occur. Even when accelerating in rearward or braking, self-energizing effect acts to increase frictional force, resulting in more effective acceleration or braking.

The coupling unit 300 detachably connects the main body 100 to the manual wheelchair 1 and includes a body side coupling member 310 and a wheelchair side coupling member 320. Since the main body side coupling member 310 and the wheelchair side coupling member 320 have a symmetrical shape, only one configuration will be described below.

The body side coupling member 310 includes a body 311, a wing 312 protruding from both sides of the body 311, a clamp 313 that engages with the wheelchair side coupling member 320 by manual operation, magnets 314 and 315 that facilitate the manipulation of the clamp 313, and an adapter part 316 for connection with the bearing provided in the main body 100 are provided.

The wheelchair side coupling member 320 includes the central member 321, the extension portions 322a and 322b rotatably connected to the central member 321, a guide portion 323a for accommodating the wing 312 of the main body side coupling member 310 to provide a mechanical coupling, and adapters 326a, 326b for coupling with the wheelchair 1 at the ends of the extensions 322a, 322b. The central member 321 has a portion for engaging the clamp 313 of the main body side coupling member 310. A magnet (not shown) may also be provided to assist manual operation. Extensions 322a, 322b cooperate with adapters 326a, 326b to connect to the wheelchair. The guide portion 323a has a groove 324a for rotatably receiving the wing 312 of the main body side coupling member 310. Both end surfaces of the wing 312 are formed to have a constant curvature. The inner surface of the wing receiving groove 324a of the guide portion 323a and 323b in which the wing 312 is accommodated is formed to have a corresponding curvature. The central member 321 and each of the extensions 322a and 322b are rotatably connected with respect to the rotation shaft 325a. Accordingly, when the wheelchair 1 is folded for storage, the wheelchair side coupling member 320 may also be folded. The main body side surfaces of the guide portions 323a and 323b are formed as inclined surfaces so as not to interfere with each other when the wheelchair is folded.

Figure 10:
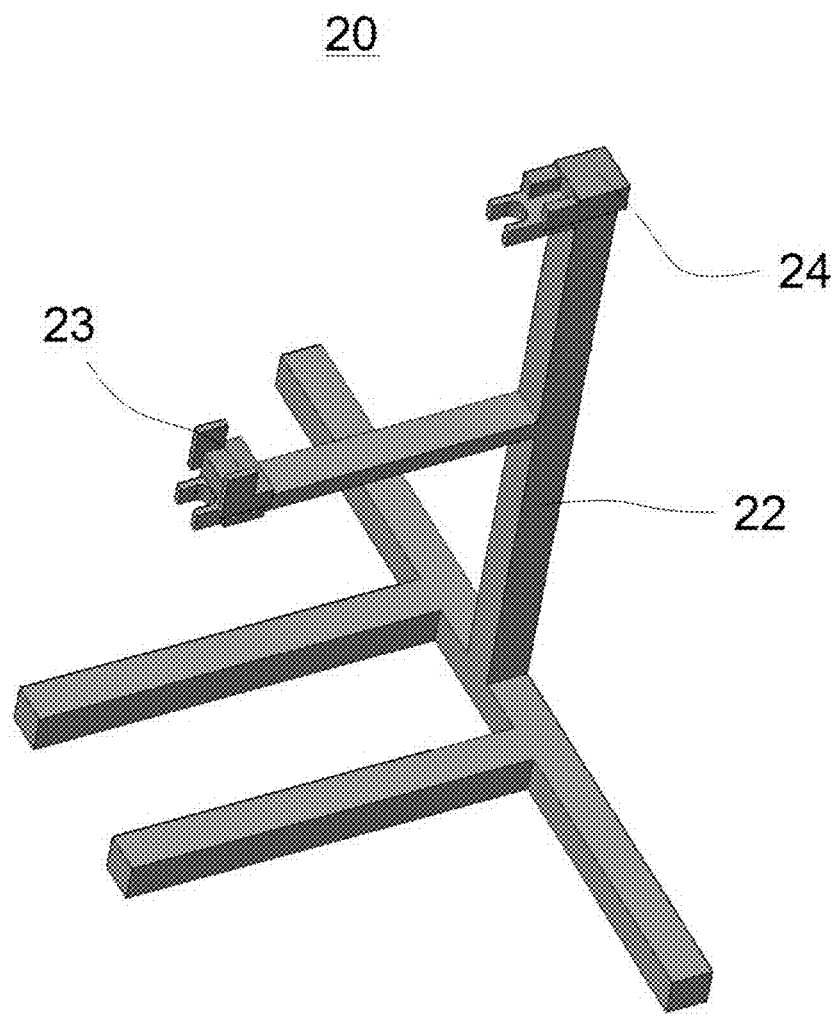
FIG. 10 is a perspective view of a cradle for accommodating a propulsion assist device in accordance with an embodiment of the present invention.

FIG. 10 shows a cradle 20 for mounting the propulsion assist device in accordance with the present embodiment. A process of attaching the propulsion assist device 10 in accordance with the present embodiment to the manual wheelchair 1 will be described as follows.

First, before the propulsion assist device 10 is attached to the manual wheelchair 1, it is mounted with an inclination to the cradle 20. As shown, the cradle 20 includes a first support part 23 and a second support part 24 that serve to catch the propulsion assist device 100 in an arbitrary portion with the vertical column 22 as the center. The first support portion 23 has a longer length compared to the second support portion 24, which is to allow the propulsion assist device 10 to stand inclined instead of standing upright while being mounted.

When the propulsion assist device 10 is mounted with an inclination to the cradle 20, the wing 312 of the main body side coupling member 310 is placed parallel to the ground, and the wheelchair side coupling member 320 is pre-mounted to the frame of the manual wheelchair 1. When a user riding in the manual wheelchair 1 approaches the cradle 20 by pulling the manual wheelchair 1, the propulsion assist device 10, which is leaned on the cradle 20, comes in between the footrests of the manual wheelchair 1. At this time, since the wing 312 is placed in parallel with the ground, it may be horizontally accommodated in the wing receiving groove 324a of the guide portion 323a.

Then, when the user stretches his arm and grabs the handle 200 of the propulsion assist device 10 and pulls it in the direction of the user as if rotating, the wing portion 312 is rotates, for example, by 30 degrees in the guide portion 323a mounted on the manual wheelchair 1.

As described above, the curvature of both end surfaces of the wing 312 is the same as the curvature of the circular hole of the wing receiving groove 324a, so that it can rotate while being fit, thereby preventing up and down shaking. In addition, according to the 30 degree rotation, the clamp 313 is engaged with the central member 321 of the wheelchair side coupling member 320 to prevent the front and back shaking. Although not shown, the clamp 313 can be firmly engaged with the central member 321 without a spring by two magnets arranged to act as a repulsive force between the clamp 313 and the central member 321.

The process of detaching the propulsion assist device 10 from the manual wheelchair 1 is opposite to the attaching process. The propulsion assist device 10 approaches the cradle 20 while being attached to the manual wheelchair 1. After approaching close enough, press the clamp 313. The clamp 313 bitten by the central member 321 is released and can be rotated in the direction of the cradle 20. The main body 100 is hung on the cradle 20.

Thereafter, when the wheel of the manual wheelchair 1 is pushed to start moving backward, the wing 312 comes out of the guide portions 323a and 323b provided in the manual wheelchair 1.

It is preferable that the propulsion assist device 10 includes a manual brake device (not shown) capable of mechanically stopping the rotation of the wheel by manual operation. Accordingly, when the motor operates differently from the user's manipulation, the propulsion assist device 10 may be stopped using the manual brake device.

FIGS. 11 to 15 show another embodiment of the coupling unit.

Figure 11:
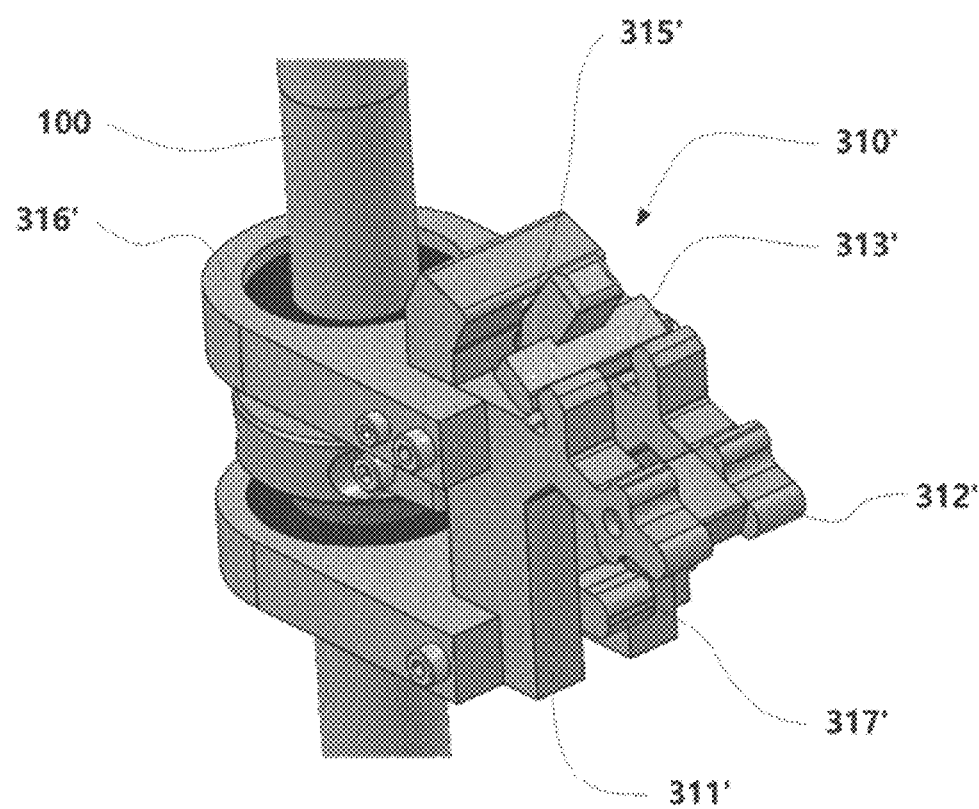
FIG. 11 is a view illustrating a main body side coupling member of a coupling unit according to another embodiment of the present invention.
Figure 12:
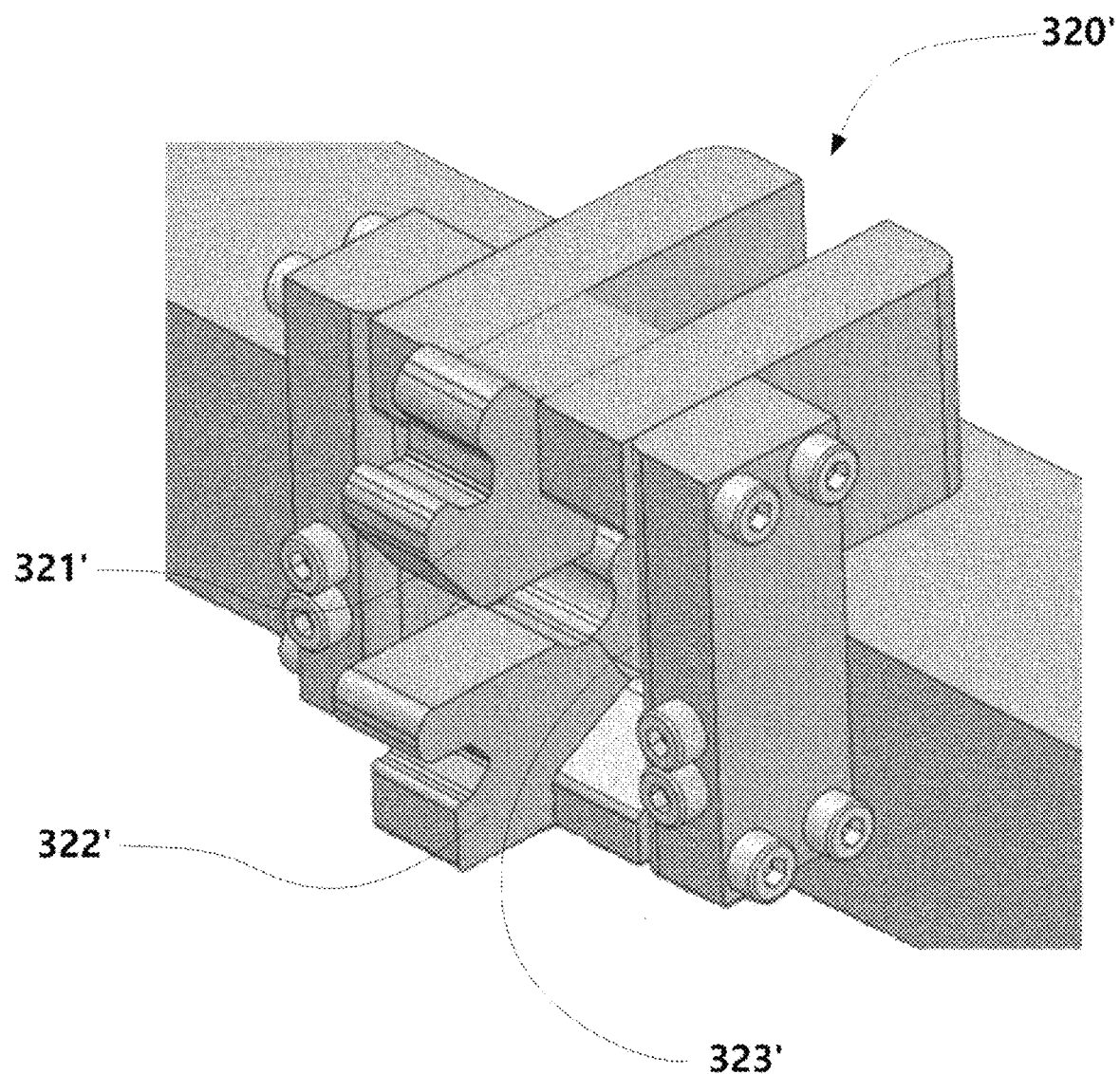
FIG. 12 is a view illustrating a wheelchair side coupling member of a coupling unit according to another embodiment of the present invention.

Referring to FIG. 11, the body side coupling member 310' includes a body part 311', a stopper 312', a fixing key 313', a fixing magnet 315' and an adapter part 316'. The body side coupling member 310' is rotatably connected to the main body 100 of the propulsion assist device via the adapter 316'. The stopper 312' protruding from the body part 311' is formed in a cross-shape at an end distal from the body part 311'. The fixing key 313' may be maintained in a state attached to the body part 311' by the fixing magnet 315'. Reference numeral 317' denotes a projection for preventing rotation. FIG. 12 shows the wheelchair side coupling member 320'. The wheelchair side coupling member 320' has an insertion hole 323' into which the stopper 312' of the body side coupling member 310' is inserted. The stopper 312' is fixed so as to be able to rotate within the insertion hole 323'. A plurality of insertion holes may be provided. In addition, key grooves into which the fixing keys 313' of the main body side coupling member 310' is inserted are provided at the upper and lower portions. The upper keyway 321' is provided for coupling when the propulsion assist device is used, and the lower keyway 322' is used for coupling when the propulsion assist device is not used.

Figure 13:
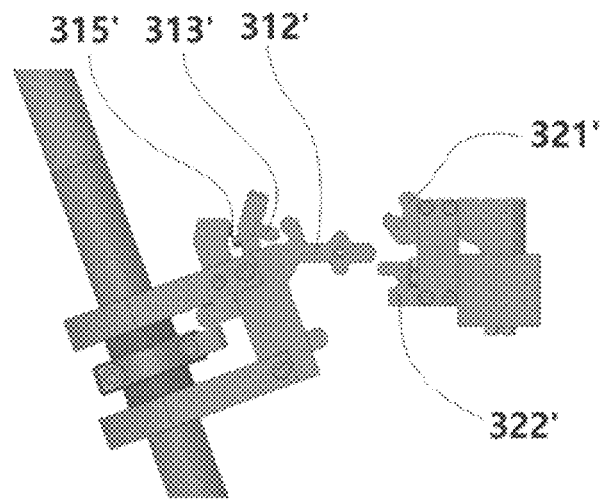
FIG. 13 is a view illustrating a state where the main body side coupling member illustrated in FIG. 11 and the wheelchair side coupling member illustrated in FIG. 12 are not coupled to each other.
Figure 14:
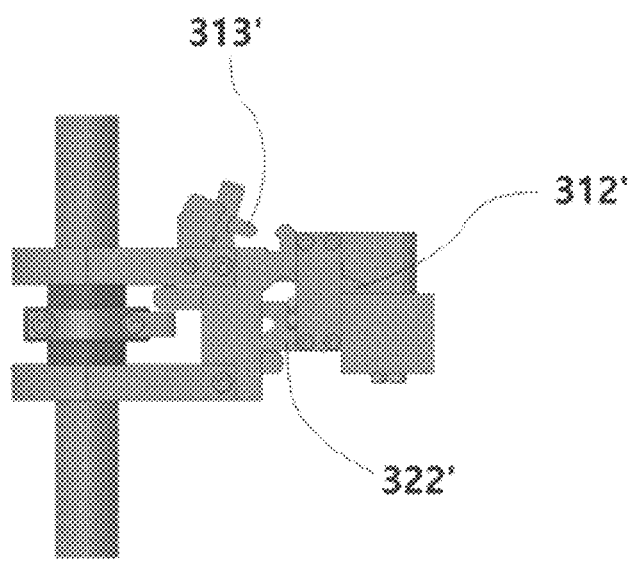
FIG. 14 is a view illustrating a first arrangement state of the main body side coupling member illustrated in FIG. 11 and the wheelchair side coupling member illustrated in FIG. 12.
Figure 15:
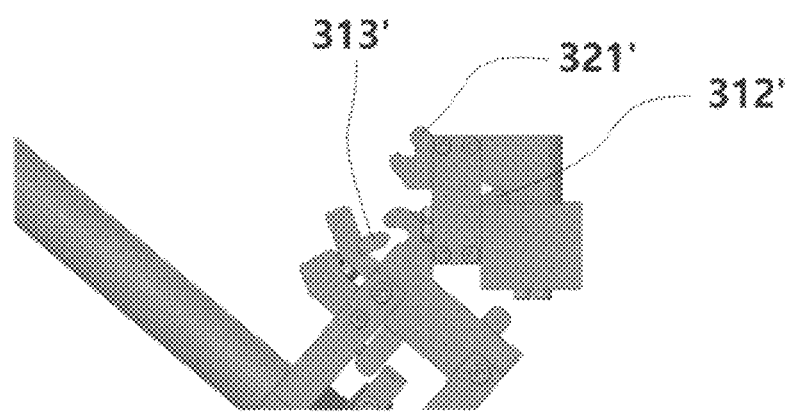
FIG. 15 is a view illustrating a second arrangement state of the main body side coupling member illustrated in FIG. 11 and the wheelchair side coupling member illustrated in FIG. 12.

FIGS. 13 to 15 illustrate the operation method of the main body side coupling member and the wheelchair side coupling member. When the wheelchair approaches the propulsion assist device, the stopper 312' is inserted into the insertion hole 323' of the wheelchair side coupling member. When the propulsion assist device rotates clockwise in FIG. 13 while the stopper 312' is inserted into the wheelchair side coupling member, the state becomes as shown in FIG. 14. Here, when the fixing key 313' is inserted into the upper keyway 321', the propulsion assist device and the wheelchair are combined (first arrangement state). Conversely, when the propulsion assist device rotates counterclockwise in FIG. 13, the state becomes as shown in FIG. 15. In this state, when the fixing key 313' is inserted into the lower keyway 322', the propulsion assist device remains connected to the wheelchair while the wheels are separated from the ground (second arrangement state).

The propulsion assistance device for a manual wheelchair in accordance with the present invention provides sufficient driving force and braking force while using a motor by the self-energizing effect. The propulsion assist device can be easily connected to manual wheelchairs without the need for bending over. The self-energizing effect is provided in a mechanical manner, and the risk of failure is low due to the simple structure of the device.

The invention claimed is:

1. A propulsion assist device detachable to a manual wheelchair, comprising:
   a main body;
   a handle provided on one end of the main body;
   a wheel operatively connected to another end of the main body and driven by a motor;
   a coupling unit for detachably connecting the main body to the manual wheelchair; and
   a wheel connection unit assisting operation of the wheel in a self-energizing manner, one end of the wheel connection unit being connected to the other end of the main body, and, to another end of the wheel connection unit, the wheel being rotatably connected,
   wherein the wheel connection unit includes:
   a base member extending in a direction perpendicular to an axis of rotation of the wheel and fixed to the main body;
   a first link having one end connected to one end of the base member for rotational movement, and the rotational movement being limited by interference with the base member in a partial range; and,
   a second link rotating in a direction opposite to a direction of rotation of the wheel when accelerating the manual wheelchair, rotational motion of the second link being limited to a partial range by interference with the base member or the first link, whereby providing a self-energizing effect to the wheel,
   wherein the rotational motion of the first link and the second link is mechanically limited by direct interference with the base member to amplify a normal load on the wheel and
   wherein the self-energizing effect is provided in both forward and reverse acceleration directions of the manual wheelchair.

2. The propulsion assist device according to claim 1, wherein the second link of the wheel connecting unit has at least three ends, a first end being rotatably connected to another end of the first link, a second end being non-rotatably connected to the wheel at an extended point of the axis of rotation of the wheel, and a third end being a free end.

3. The propulsion assist device according to claim 2, wherein the second link of the wheel connection unit is formed to extend in a direction from the second link toward the base member, and further including a stopper that interferes with the base member to limit a rotation shaft of the wheel to be positioned within a predetermined range from the base member.

4. The propulsion assist device according to claim 3, wherein the stopper, when accelerating the manual wheelchair in the forward direction, interferes with the base member of the wheel connection unit to limit the wheel from moving in a forward direction.

5. The propulsion assist device according to claim 3, wherein the stopper, when the manual wheelchair accelerates in a rearward direction, interferes with the base member of the wheel connection unit to limit the wheel from moving in a reverse direction.

6. The propulsion assist device according to claim 1, wherein the coupling unit includes: a propulsion assist device side coupling member rotatably connected to the main body; and a wheelchair side coupling member detachably connected to the propulsion assist device side coupling member and connected to left and right sides of the manual wheelchair, respectively.

7. The propulsion assist device according to claim 6, wherein the wheelchair side coupling member of the coupling unit is formed to be foldable in a central area.

8. The propulsion assist device according to claim 6, wherein the propulsion assist device side coupling member and the wheelchair side coupling member are connected in at least two ways.

9. The propulsion assist device according to claim 8, wherein at least one of the connections are formed to be mechanically connected when the propulsion assist device rotates with respect to the manual wheelchair.

10. The propulsion assist device according to claim 8, wherein at least one of the connections are formed so as to be able to be manually connected and released.

11. The propulsion assist device according to claim 6, wherein, by the coupling unit, the wheel of the propulsion assist device is formed to be fixed in a first arrangement in contact with the ground and in a second arrangement in which the wheel does not contact the ground.

12. The propulsion assist device according to claim 1, further comprising a manual brake device capable of mechanically stopping the rotation of the wheel by manual operation.

13. The propulsion assist device according to claim 1, wherein the motor driving the wheel is a hub motor.

14. The propulsion assist device according to claim 1, further comprising a battery for supplying power to the motor driving the wheel.

15. The propulsion assist device according to claim 1, further comprising a cradle for mounting the propulsion assist device in a state separated from the manual wheelchair.

16. The propulsion assist device according to claim 14, wherein the cradle includes a charging unit for charging a battery of the propulsion assist device.

17. The propulsion assist device according to claim 1, further comprising a shock absorber for reducing vibration and shock transmitted from the wheel to the main body.

18. The propulsion assist device of claim 1, wherein the wheel connection unit is configured to provide the self-energizing effect during deceleration of the wheelchair, thereby assisting braking.

\* \* \* \* \*